Figure 1:
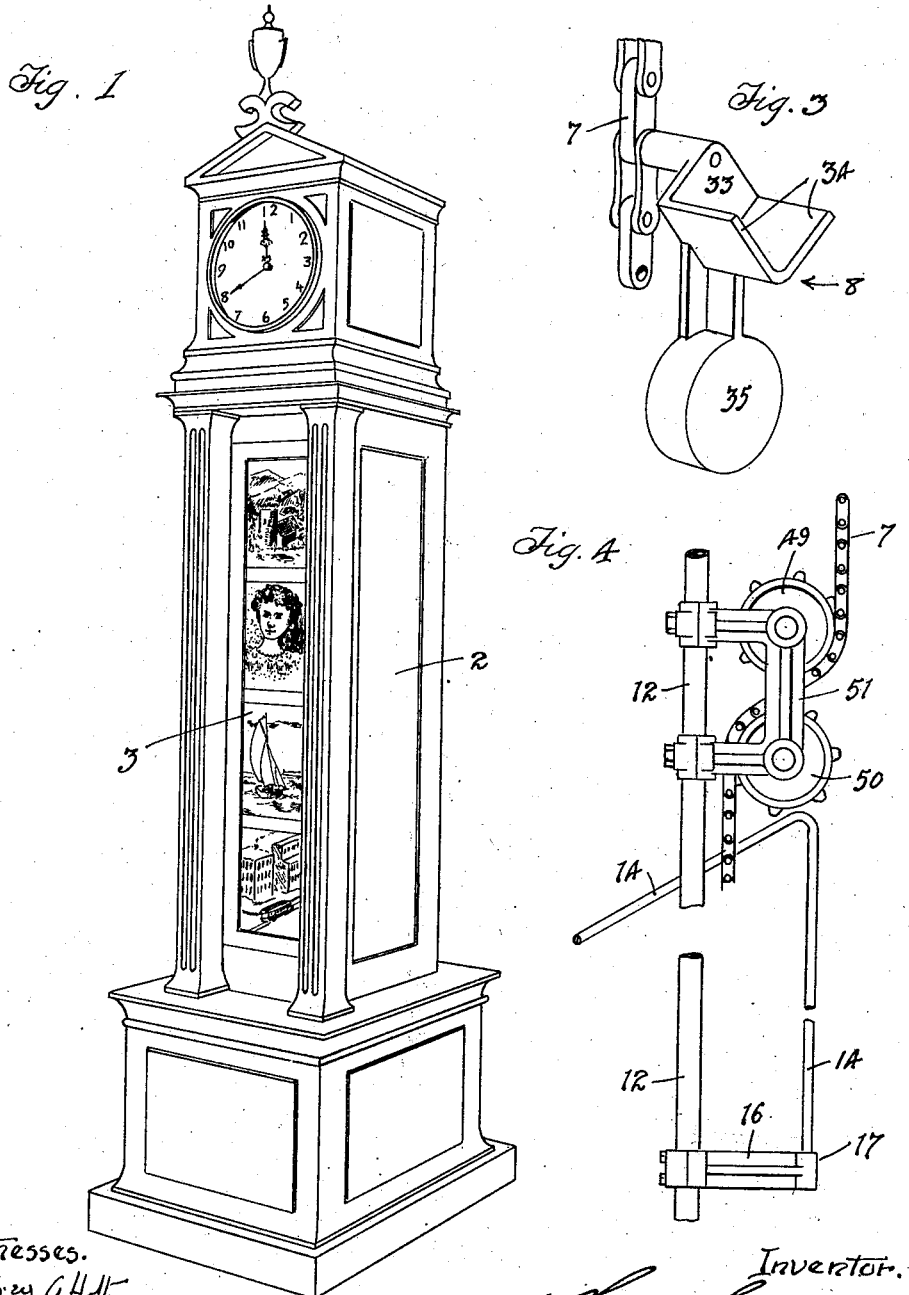

H. HOLDEN.
DISPLAY APPARATUS.
APPLICATION FILED MAR. 6, 1911.

1,027,606.

Patented May 28, 1912.
4 SHEETS—SHEET 2.

Witnesses:
Geoffrey G. Holt.
Fred W. Brown.

Inventor.
Harry Holden

H. HOLDEN.
DISPLAY APPARATUS.
APPLICATION FILED MAR. 6, 1911.
1,027,606.
Patented May 28, 1912.
4 SHEETS—SHEET 3.
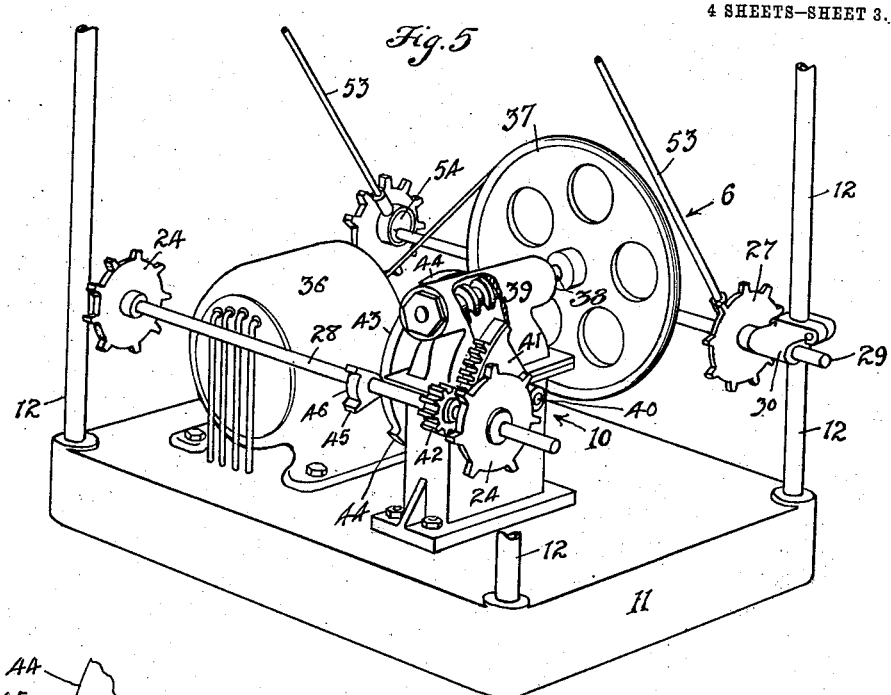
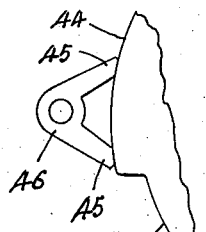
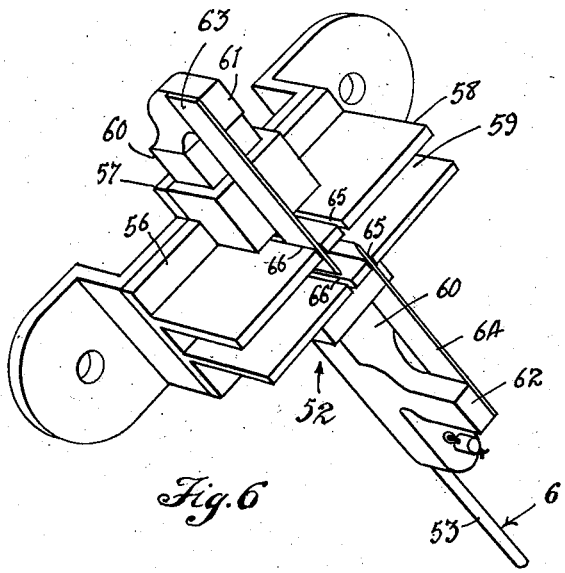
Witnesses.
Geoffrey G. Holt.
Fred. W. Brown.
Inventor
Harry Holden
By Alex N. Lidders
Attorney H. HOLDEN.
DISPLAY APPARATUS.
APPLICATION FILED MAR. 6, 1911.
1,027,606.
Patented May 28, 1912.
4 SHEETS—SHEET 4.
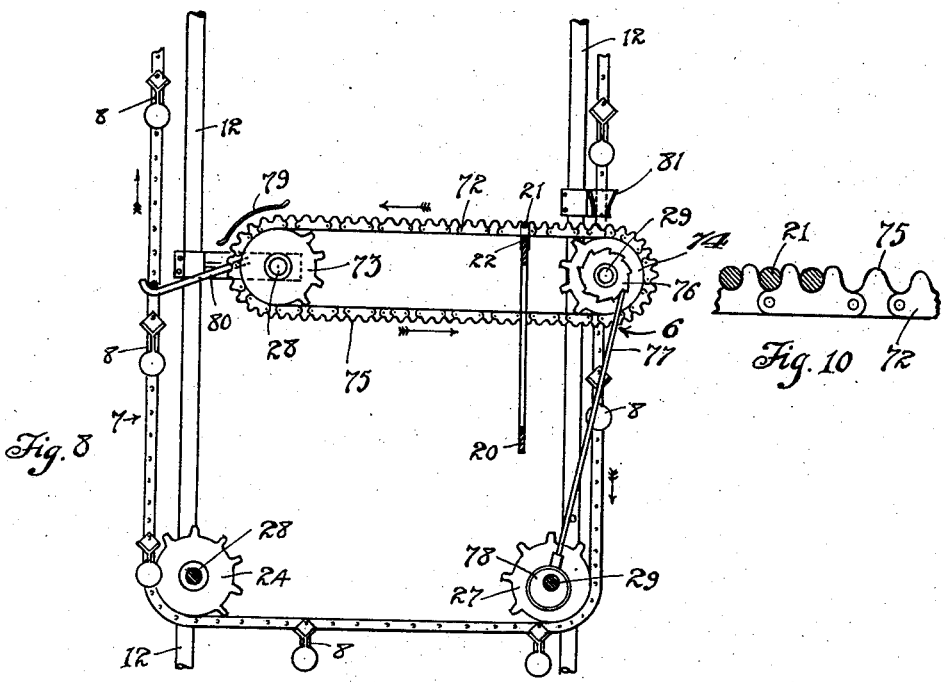
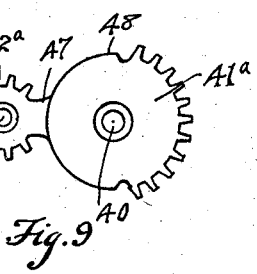

UNITED STATES PATENT OFFICE.

HARRY HOLDEN, OF LOS ANGELES, CALIFORNIA, ASSIGNOR TO EMMA LANG INVESTMENT COMPANY, OF LOS ANGELES, CALIFORNIA, A CORPORATION OF CALIFORNIA.

DISPLAY APPARATUS.

1,027,606.  Specification of Letters Patent.  Patented May 28, 1912.

Application filed March 6, 1911. Serial No. 613,932.

*To all whom it may concern:*

Be it known that I, HARRY HOLDEN, a citizen of the United States of America, residing at Los Angeles, in the county of Los Angeles, State of California, have invented a certain new and useful Display Apparatus; and I do hereby declare the following to be a full, clear, and exact description of the invention, such as will enable others skilled in the art to which it appertains to make and use the same.

This invention relates to display apparatus, more particularly to such as is adapted for advantageously displaying signs, pictures, cuts, maps, diagrams, etc., for either advertising or instructive purposes as may be desired; and it may be said to consist in the novel construction, arrangement and combination of the parts thereof as will be apparent from the description hereinafter and as set forth in the appended claims.

One object of the invention is to provide novel and improved means whereby a variable number of unitary signs, pictures, etc., placed in a magazine may be successively automatically fed from the magazine and intermittently moved to be placed on view along with one or more of the signs, pictures, etc., preceding or following it and in due course returned to the magazine to repeat the operation in its turn.

Another object of the invention is to provide improved means to illuminate the signs, pictures, etc., by artificial light and reflectors so placed as to throw the light against the back of the signs, pictures, etc., so as to make them appear as transparencies.

Still another object of the invention is to provide a novel construction for the frame which carries the sign, picture, etc., as also novel mechanism co-acting therewith whereby it is automatically fed from a magazine and then automatically intermittently moved to display it and then return it to the magazine.

Further objects of the invention are to provide a novel and improved apparatus of the class specified, which shall be of simple construction, cheap to manufacture and maintain, effective in operation and which shall permit of the signs, pictures, etc., in the magazine being readily placed, changed or replaced when desired.

Other objects and the advantages of the invention will be apparent to those skilled in the art from a consideration of the following description of the preferred construction embodying it, taken in connection with the accompanying drawings, in which—

Figure 2:
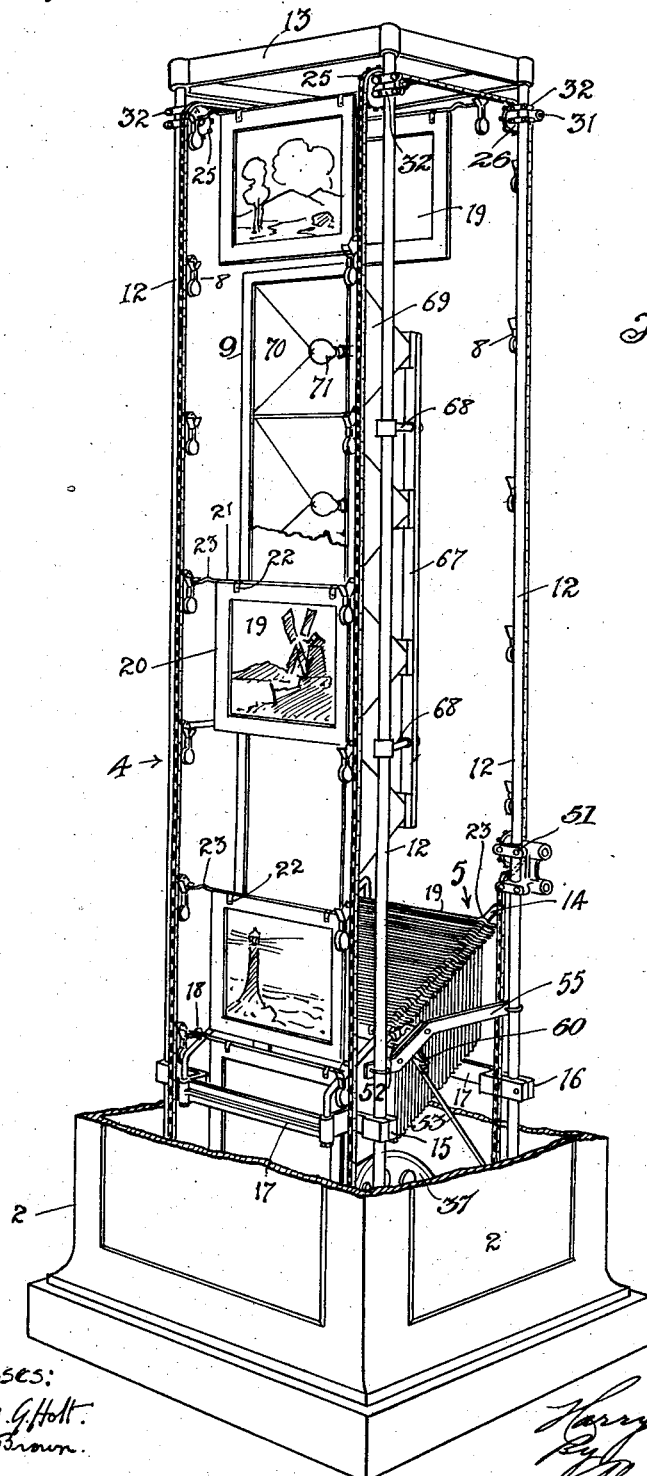

Figure 1 is a perspective view of the cabinet containing the apparatus, Fig. 2 is a perspective view of a portion of the apparatus, Fig. 3 is a view in perspective of one of the carriers pivotally mounted on the sprocket chain, Fig. 4 is a side elevation of a portion of the apparatus near the point where the signs, pictures, etc., are delivered to the magazine, Fig. 5 is a view of the base and parts mounted thereon, Fig. 6 is an enlarged perspective view of the escapement, Fig. 7 is a partial view of the stop mechanism, Fig. 8 is a side view of a portion of the apparatus, showing a modified construction for the magazine and associated parts, Fig. 9 is a side elevation of a modified construction for the gears operatively connected with the driving shaft of the carrier mechanism, and Fig. 10 is a partial view of the toothed sprocket chain.

The cabinet 2 may be provided in the front central portion thereof with a glass window or panel 3 and it may have disposed therein the preferably unitary and self-contained mechanism comprising the frame 4, magazine 5, feeding devices 6, endless chains 7 with pivoted carriers 8 thereon, illuminating means 9, and means 10 for intermittently driving the chain 7. The frame may consist of the substantially rectangular base 11, the corner posts 12 on the base, and the substantially rectangular brace piece 13 connected to the posts at the top thereof.

As may be seen by referring to Figs. 2 and 4, one form of construction for the magazine 5 may consist of the rods 14 connected as shown to the outwardly projecting central portion 17 on the brackets 15 and 16 which are mounted on the lower portion of the front and rear posts respectively, the rods 14 being provided with pins or stops 18 at the front portions thereof and formed and arranged to be inclined downwardly from the rear to the front thereof. A plurality of signs, pictures, etc., 19 may be placed in the magazine, they being each preferably mounted in an aluminum frame 20 which may be carried by a rod 21 by means of straps 22. In order to guide the rod 21 while it is sliding down the inclined way provided by the rods 14 of the magazine and to retain it and the parts carried thereby in proper position at right angles to the rods 14, it may be formed with upwardly extending bends 23 in the portions thereof near its ends which contact with the rods 14.

The endless sprocket chains 7 may each be passed around sprocket wheels 24, 25, 26 and 27 arranged oppositely on shafts suitably carried by the posts 12 near the bottom and top of the latter. The sprocket wheels 24 and 27 may be rigidly mounted respectively on the front shaft 28 and the rear shaft 29 journaled in bearings provided by lugs 30 clamped to the posts, and the sprocket wheels 25 and 26 may be loosely mounted on stub shafts 31 secured in position by means of lugs 32 clamped to the posts.

The pivotally mounted carriers 8 are preferably arranged equidistant on each of the chains 7 and those on one chain are placed oppositely to those on the other, and they may comprise the part 33 having inwardly extending and downwardly converging sides 34 and the suspended weight 35 for keeping it upright.

The means 10 for driving the shaft 28 and consequently the chains 7 may comprise a motor 36 belted to pulley 37 on shaft 38 which, by means of a worm and wheel in casing 39, drives shaft 40 on which is rigidly mounted a segmental gear 41 adapted to mesh with a pinion 42 on shaft 28. On shaft 40 is also mounted a disk 43 having a portion 44 thereof of increased diameter and with which portion the ends of diverging fingers 45 on a part 46 mounted on shaft 28 are adapted to contact to stop any turning of the shaft 28. The shaft 40 is continuously driven but the pinion 42 is only intermittently driven by segmental gear 41 and it makes but one revolution each time it is so driven because of the shaft being stopped from turning by the fingers 45 contacting with the disk 43.

In Fig. 9 is shown a modified construction that may be substituted for segmental gear 41, pinion 42, disk 43 and part 46. In this case the pinion 42$^a$ is provided with a projecting part 47 which has a concave face at the end thereof adapted to contact with the curved surface 48 of the gear 41$^a$ to thereby prevent shaft 28 from turning. Near the point where the signs, etc., are delivered to the magazine by the carrier mechanism, the chains 7 may pass forwardly and downwardly (see Fig. 4) from the sprocket wheel 49 to the sprocket wheel 50, the sprocket wheels being preferably carried by a bracket 51 mounted on the rear posts 12; this offset in the path of the chains 7 is to prevent any fouling of the signs, etc., with each other when they are being delivered to the magazine.

The feeding device 6 (see Figs. 2, 5 and 6) may consist of similar escapements 52 oppositely arranged on each side of the magazine 5 near the forward end thereof and each operatively connected by means of a rod 53 with an eccentric 54 on the shaft 29. The escapement may be suitably arranged on an incline on a side bar 55 secured to the posts 12 and it may consist of the part 56 having thereon a guide 57 and having an inwardly projecting part 58 having a slot 59 designed and arranged to receive the ends of the rods 21 carrying the views, etc., as they slide down the ways of the magazine; a sliding block 60 is arranged in the guide 57 and has at the ends thereof inwardly projecting parts 61 and 62 carrying a blade 63 and 64 respectively, which blades are adapted to move back and forth through upper and lower slots 65 and 66 in the inwardly projecting part 58 to permit of each of the views, etc., moving separately against the stops 18 in regular order and at the proper time for being picked up by the carriers 8 on the endless chains 7, as will be understood.

The illuminating means 9 may consist of a frame 67 carried by rearwardly extending arms 68 affixed to the front posts 12, the frame having mounted thereon a suitable number of reflectors 69 each preferably comprising reflecting surfaces 70, which diverge forwardly of the frame 67 and are adapted to throw the light from the lamp 71 which is arranged centrally therebetween so that the light shall be fully directed against the rear of the view, etc., that is always immediately in front of the reflector in the normal operation of the apparatus.

From the foregoing, it will be evident that the number of views, etc., that the apparatus will handle is variable and can be either just enough to supply all the carriers 8 or if desired an additional number can be placed in the gravity slide ways. All the pictures are shown consecutively and in rotation. As the apparatus is adapted to handle a greater number of views, etc., than there are carriers in the mechanism, the surplus are supported and held by the gravity slide ways until such time as they are automatically and individually released therefrom (by the escapement) to be picked up by the carriers. Whenever a view is thus released from the lower end of the gravity ways, another is delivered to the said gravity ways at their higher end, thus the number of views, etc., being moved from and placed in the magazine by the carriers is always the same.

The views, etc., having been placed in the magazine, above the escapement, with the bends 23 in the rods 21 straddling the rods 14, as soon as the mechanism actuates the escapement one view is released therefrom and slides by gravity down the rods 14 until stopped by the pins 18. As soon as the mechanism has released said view, etc., from the escapement the intermittent gears 41 and 42 of the main drive begin their period of rest. Upon further movement of the mechanism the view is picked up by the carriers and moved up one space or until its lower edge has cleared the stop pins 18. Just before said view reaches this position and while the intermittent gears 41 and 42 are still in mesh the escapement releases another view which moves into position by gravity to the point just vacated by the first view mentioned. At this moment the gears again rest for a time period, one view being on display and another ready in position to be picked up by the carriers during the next movement of the mechanism. The cycle of operation is continuous and causes the views on display behind the glass panel to move up one space and then rest for a time period, then move another space and rest again, etc. After a view has traveled upward past the glass panel it moves across the top and down the back of the main frame of the machine to the point where it is disengaged by the carriers by the rod 21 coming in contact with the rods 14 and thus takes its place again in the gravity slide ways to await its next turn for display. After the carriers transfer the views, etc., to the gravity ways they continue to move downward, then across the bottom and up the front of the main frame to the point where they again pick up a view, etc., and so continue around, the movement of the carrier chains always being in the same direction.

A modified form of construction for the magazine and the feeding mechanism is illustrated in Figs. 8 and 10, the left side portion thereof only being shown since the right side portion is similar in construction and arrangement. The magazine consists of the endless sprocket chains 72 provided with teeth 75 thereon and passing around sprocket wheels 73 and 74 suitably carried by the posts 12. The feeding mechanism consists of the ratchet wheel 76 rigidly connected to sprocket wheel 74, and a rod 77 having one end thereof in engagement with the teeth of the ratchet wheel and operatively connected to the eccentric 78 on the shaft 29; a guard 79 may be arranged adjacent to the upper forward portion of sprocket wheel 73 to retain the views, etc., in place on the sprocket chains 72 as they move downwardly and forwardly over the sprocket wheel 73 to the position where each is separately delivered to the slideway 80 extending downwardly and forwardly from the point of delivery to the chains 7 having the carriers 8 thereon. Guides 81 may be secured to each of the rear posts 12 to insure that the ends of the rods carrying the view shall fall into directly opposite spaces between the teeth 75 of the two chains 72 so as to assume a position at right angles to said chains. The mode of operation will be apparent from the foregoing, it being understood that the rod 77 is operated by the eccentric 78 to actuate the ratchet wheel 76 and sprocket wheel 74 to move the sprocket chains 72 forwardly at the proper time to deliver a view to the slideway 80 in time for it to reach the lower end of the slideway so as to be picked up by the carriers 8 as they move upwardly past the end of the slideway at the outer sides thereof.

While divers forms of construction embodying the invention have been illustrated and described, there are still many changes and modifications that will readily occur to those skilled in the art, therefore the right is reserved to all such changes and modifications as do not depart from the spirit and scope of the invention as defined in the appended claims.

I claim:

1. In display apparatus, the combination of a frame, a magazine mounted thereon, a plurality of rods carrying display matter arranged in the magazine, mechanism to receive said rods from and carry the same to said magazine, said magazine including endless chains and pivotally mounted carriers placed oppositely on said chains and each comprising a part adapted to receive an end portion of said rods and a suspended weight connected to said part for continuously keeping the carrier in upright position, means on said frame above the delivery end of the magazine to cause said chains and consequently said rods to pass forwardly and downwardly to prevent any fouling of rods carrying display matter when they are being delivered to said magazine, and means for progressing said mechanism.

2. In display apparatus, the combination of a magazine, a plurality of rods carrying display matter arranged in the magazine, and mechanism for moving said rods from the magazine to place the display matter on view, said mechanism constructed and arranged to carry said rods to the magazine after the display matter carried thereby has been placed on view and including endless chains and pivotally mounted carriers placed oppositely on said chains and each comprising a part having inwardly extending and downwardly converging sides adapted to receive an end portion of said rods and a suspended weight connected to said part for continuously keeping the part in upright position, substantially as described.

3. In display apparatus, the combination of a magazine, a plurality of rods carrying display matter arranged in the magazine, and mechanism to receive said rods from and carry the same to said magazine, said mechanism including endless chains and pivotally mounted carriers placed oppositely on said chains and each comprising a part adapted to receive an end portion of said rods, and a suspended weight connected to said part for continuously keeping the carrier in upright position, substantially as described.

4. In display apparatus, the combination of a cabinet provided with a glass panel in the front thereof, a frame arranged on the interior of the cabinet, self-contained mechanism disposed in the cabinet for moving display matter past said panel, said mechanism including endless sprocket chains carried on said frame, a magazine arranged adjacent thereto, a plurality of rods carrying the display matter arranged in said magazine, pivotally mounted carriers arranged equidistant and oppositely on the sprocket chains and each comprising a part provided with a suspended weight to keep the part continuously in upright position, said part having inwardly extending and downwardly converging sides adapted to receive an end portion of said rods to carry the same to and from the magazine, and means for intermittently progressing said sprocket chains, substantially as described.

In testimony whereof, I have signed my name to this specification in the presence of two subscribing witnesses at Los Angeles county of Los Angeles, State of California, this 30th day of January A. D. 1911.

HARRY HOLDEN.

Witnesses:
HARRY A. BROOKS,
ALEX. H. LIDDERS.

Copies of this patent may be obtained for five cents each, by addressing the "Commissioner of Patents, Washington, D. C."